US008206030B1

(12) United States Patent
Salour

(10) Patent No.: US 8,206,030 B1
(45) Date of Patent: Jun. 26, 2012

(54) MULTIPLE SENSING TIP OPTICAL FIBER THERMOMETER

(75) Inventor: Michael M. Salour, Carlsbad, CA (US)

(73) Assignee: IPITEK, Inc., Carlsbad, CA (US)

(*) Notice: Subject to any disclaimer, the term of this patent is extended or adjusted under 35 U.S.C. 154(b) by 433 days.

(21) Appl. No.: 12/468,598

(22) Filed: May 19, 2009

Related U.S. Application Data

(60) Provisional application No. 61/054,423, filed on May 19, 2008.

(51) Int. Cl.
G01J 5/54 (2006.01)
G01K 11/32 (2006.01)

(52) U.S. Cl. ............... 374/161; 374/131; 356/43

(58) Field of Classification Search ......... 374/120, 374/121, 130, 131, 132, 137, 107, 110, 112, 374/115, 17, 161; 356/43, 44, 73.1; 250/338.1, 250/494.1, 504 R, 472.1, 474.1, 486.1; 600/474, 600/549
See application file for complete search history.

(56) References Cited

U.S. PATENT DOCUMENTS

| | | | | |
|---|---|---|---|---|
| 4,558,217 A | * | 12/1985 | Alves ............... | 250/227.23 |
| 4,562,348 A | * | 12/1985 | Brogardh et al. ...... | 250/227.21 |
| 4,673,299 A | | 6/1987 | Dakin | |
| 4,729,668 A | * | 3/1988 | Angel et al. ............ | 374/161 |
| 4,749,254 A | * | 6/1988 | Seaver ............... | 385/12 |
| 4,756,627 A | * | 7/1988 | Nelson ............... | 374/159 |
| 4,776,827 A | | 10/1988 | Greaves | |
| 4,816,687 A | | 3/1989 | Fehrenbach et al. | |
| 4,865,416 A | * | 9/1989 | Pratt ............... | 385/12 |
| 4,904,864 A | * | 2/1990 | Dakin et al. ......... | 250/227.18 |
| 5,028,146 A | | 7/1991 | Wada | |
| 5,035,511 A | | 7/1991 | Berthold | |
| 5,035,513 A | | 7/1991 | Fehrenbach et al. | |
| 5,348,396 A | | 9/1994 | O'Rourke et al. | |
| 5,730,134 A | * | 3/1998 | Dumoulin et al. ....... | 600/412 |
| 5,730,528 A | * | 3/1998 | Allison et al. ........... | 374/161 |
| 5,928,222 A | * | 7/1999 | Kleinerman ........... | 606/16 |
| 5,965,877 A | * | 10/1999 | Wood et al. ............ | 250/227.15 |
| 5,980,105 A | | 11/1999 | Rouhet et al. | |
| 6,017,148 A | | 1/2000 | Rouhet et al. | |
| 6,167,066 A | | 12/2000 | Gaeta et al. | |
| 6,325,536 B1 | * | 12/2001 | Renken et al. .......... | 374/161 |
| 6,330,479 B1 | | 12/2001 | Stauffer | |
| 7,284,903 B2 | * | 10/2007 | Hartog ............... | 374/130 |
| 7,582,050 B2 | | 9/2009 | Schlorff et al. | |
| 7,717,618 B2 | | 5/2010 | Saxena et al. | |
| 2003/0185275 A1 | * | 10/2003 | Renschen et al. ....... | 374/130 |
| 2005/0251235 A1 | | 11/2005 | Schlorff et al. | |
| 2006/0077394 A1 | | 4/2006 | Suzuki et al. | |

(Continued)

OTHER PUBLICATIONS

T. Juang et al., Construction of a Conformal Water Bolus Vest Applicator for Hyperthermia Treatment of Superficial Skin Cancer, Internat. Con. of the IEEE Eng. in Med. and Bio. Soc., Sep. 2004, pp. 1-4, San Francisco.

(Continued)

Primary Examiner — Gail Verbitsky
(74) Attorney, Agent, or Firm — Burns & Levinson LLP; Jacob N. Erlich

(57) ABSTRACT

A linear array fiber-optic temperature sensor based upon fluorescence-decay technology allows for optical cabling to employ multiple, individually optically addressed optical fibers with sensing tips located in a single sensing tube. The sensing tips are arranged with a pre-determined, fixed relative spacing to form a linear array of temperature measurement points. Multiple such linear array sensors may be further arranged.

8 Claims, 5 Drawing Sheets

U.S. PATENT DOCUMENTS

2006/0245468 A1  11/2006  Hartog
2008/0304543 A1* 12/2008  Abe et al. ................ 374/120
2009/0296778 A1* 12/2009  Kinugasa et al. ............ 374/161

OTHER PUBLICATIONS

T. V. Samulski et al., Clinical Experience with a Multi-element Ultrasonic Hyperthermia System: Analysis of Treatment Temperatures, Internat. J. Hyperthermia, Sep. 1990, pp. 909-922, vol. 6, No. 5.

C. J. Diederich et al., Preclinical Evaluation of a Microwave Planar Array Applicator for Superficial Hyperthermia, Internat. J. Hyperthermia, Mar. 1993, pp. 227-246, vol. 9, No. 2.

C. J. Diederich et al., An Improved Bolus Configuration for Commercial Multielement Ultrasound and Microwave Hyperthermia Systems, Med. Phys., Jun. 1994, pp. 1401-1403, vol. 21, No. 9.

P. R. Stauffer et al., Preliminary Clinical Experience with Planar and Conformal Microwave Array Applicators for Hypothermia, Abstract of presentation given at 14th North American Hyperthermia Society Meeting, 1994, Nashville TN.

P. R. Stauffer, Thermal Therapy Techniques for Skin and Superficial Tissue Disease, Critical Review: Matching the Energy Source to the Clinical Need, SPIE Optical Engineering Press, 2000, pp. 327-367.

P. R. Stauffer et al., Progress on System for Applying Simultaneous Heat and Brachytherapy to Large-area Surface Disease, Proc. of SPIE, 2005, pp. 82-96, vol. 5698.

T. Juang et al., Multilayer Conformal Applicator for Microwave Heating and Brachytherapy Treatment of Superficial Tissue Disease, Int. J. Hyperthermia, Nov. 2006, pp. 527-544.

P. R. Stauffer, Progress on Conformal Microwave Array Applicators for Heating Chestwall Disease, Proc. of SPIE, 2007, pp. 1-13, vol. 6440.

K. Arunachalam et al., Performance Evaluation of a Conformal Thermal Monitoring Sheet Sensor Array for Measurement of Surface Temperature Distributions During Superficial Hyperthermia Treatments, Int. J. Hyperthermia, 2008, pp. 313-325, vol. 24, No. 4.

K. Arunachalam et al., A Thermal Monitoring Sheet With Low Influence From Adjacent Waterbolus for Tissue Surface Thermometry During Clinical Hyperthermia, IEEE Trans. Biomed. Engr., Oct. 2008, pp. 2397-2406, vol. 55, No. 10.

P. R. Stauffer, Devices and Techniques for Thermal Therapy of Chest Wall Recurrence, Abstract of presentation for Society for Thermal Medicine 2006 Annual Meeting, 2006, Bethesda MD.

T. Juang et al., Improved Patient Interface for a Multilayer Conformal Applicator for Simultaneous Heat and Brachytherapy Treatment of Superficial Tissue Disease, Abstract of presentation for Society for Thermal Medicine 2006 Annual Meeting, 2006, Bethesda MD.

P. Stauffer et al., Progress on Conformal Microwave Array Applicators for Heating Large Area Chest Wall Disease, Abstract of presentation for Euro. Soc. for Hyperthermic Oncology 24th Annual Meeting, Jun. 2007, Prague.

K. Arunachalam et al, Characterization of Surface Thermometry Approaches for Clinical Hyperthermia, Abstract of presentation for 10th Int. Congress on Hyperthermic Oncology, Apr. 2008, Munich.

Paul R. Stauffer et al., U.S. Appl. No. 12/475,151, filed May 29, 2009, titled Thermal Monitoring Device.

Michael M. Salour, U.S. Appl. No. 12/475,044, filed May 29, 2009, titled Imaging Temperature Sensing System.

Celestino J. Gaeta, U.S. Appl. No. 12/429,463, filed Apr. 24, 2009, titled Passive Wavelength-Division Multiplexing (WDM) Fiber-Optic Temperature Sensor.

* cited by examiner

MULTIPLE SENSING TIP OPTICAL FIBER THERMOMETER

CROSS REFERENCE TO RELATED APPLICATIONS

This application claims priority of provisional application Ser. No. 61/054,423 filed May 19, 2008 entitled MULTIPLE SENSING TIP OPTICAL FIBER THERMOMETER and which provisional application is incorporated herein in its entirety.

BACKGROUND

Various embodiments of this invention facilitate the introduction of multiple fiber-optic thermometers into a measurement environment with a predetermined and fixed relative arrangement.

One application is for the medical profession. Certain types of prostrate cancer are treated by microwave radiation to heat and kill cancerous cells in the tumor. During this treatment, temperatures are measured at various locations within the tumor as the microwave radiation is applied in order to monitor and/or control the procedure. Fiber optic temperature sensors are used in this type of situation because they are compatible with the microwave fields employed, in contrast to a standard temperature sensor such as a thermistor or thermocouple. Accommodating multiple sensors with individual catheters for each sensor is cumbersome and time consuming, and may be difficult or impossible to insert into a relatively small volume including, but not limited to a prostrate. The number of required catheters, as well as the time and complexity for insertion into the relatively small volume to be monitored, need to be substantially reduced.

Another application involves the electric power industry. Monitoring for hot spots within electrical devices including, but not limited to, an electric power transformer and applying cooling or reduced operation, when needed, can extend lifetime of the electrical devices. Fiber-optic temperature sensors are compatible with the environment within such electrical devices that may include high-amplitude electric fields.

Past fiber-optic temperature sensors including, but not limited to, those sensors based upon fluorescence-decay technology employ a single temperature-sensing optical fiber equipped with a connector at one end. A temperature-sensitive phosphor is present on the other end (sensing tip). A furcation tube, beginning at the connector, may be incorporated to better protect most of the fiber. Typically, a section (tip extension) of the fiber adjacent to the sensing tip extends from the furcation tube with protection from environmental and impact damage accomplished by a thin-walled outer tube. The tip extension facilitates access to locations with relatively small size.

Previous fluorescence-decay fiber-optic sensor design with a single sensing tip has limitations when applied to applications requiring multiple points of measurements at a set of locations with a fixed relative spacing. This technique is time consuming and often impractical.

SUMMARY

The needs for the invention set forth above as well as further and other needs and advantages of the present invention are achieved by the embodiments of the invention described herein below.

Providing an optical temperature sensing system, which includes a linear array of fiber-optic temperature-sensing points with a predetermined, fixed relative arrangement between sensor points. An embodiment describes a fiber-optic temperature sensor based upon fluorescence-decay technology but allowing for optical cabling to employ multiple, individually optically addressed optical fibers with sensing tips located in a single sensing tube. Each sensing tip contains a phosphor that performs the temperature sensing function. The tips are arranged with a pre-determined, fixed relative spacing to form a linear array of temperature measurement points. Multiple such linear array sensors may be used.

An embodiment basically includes an optical temperature sensing system includes a plurality of means for inputting light at a first optical wavelength band and outputting light at a second optical wavelength band; a plurality of means for absorbing the light at the first optical wavelength band and emitting the light at said second optical wavelength band; the light at the second optical wavelength band includes features dependent upon temperature of the absorbing means; a plurality of means for propagating the light at the first optical wavelength band from each one of the plurality of inputting and outputting means to a unique one of the plurality of absorbing means and propagating the light at the second optical wavelength band from each one of the plurality of absorbing means to a unique one of the plurality of inputting and outputting means; and means for positioning each one of the plurality of absorbing means in a fixed relative position with respect to one another such that location of temperature reading for each of the absorbing means is determined based upon the temperature-dependent features and the fixed relative position of the absorbing means.

For a better understanding of the present invention, together with other and further needs thereof, reference is made to the accompanying drawings and detailed description and its scope will be pointed out in the appended claims.

DETAILED DESCRIPTION

Figure 1:
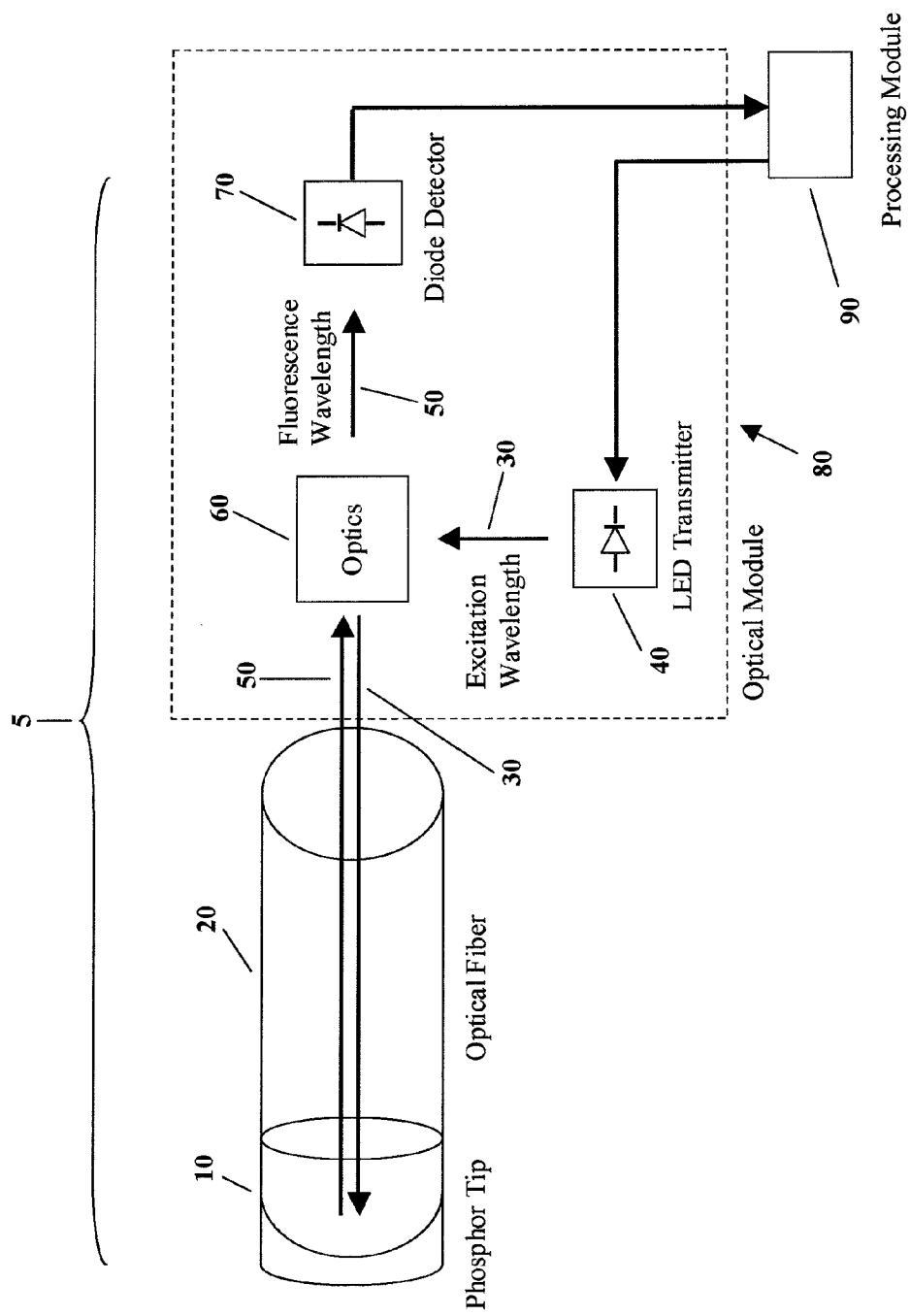
FIG. 1 is a schematic block diagram illustration of a basic temperature-dependent fluorescence-decay temperature sensor.

Various embodiments of the proposed temperature sensors utilize the temperature-dependent fluorescence-decay of an atomic resonance to measure temperature. As shown in FIG. 1, a phosphor or sensing element, or tip 10 exhibiting temperature-dependent fluorescence-decay, attached or connected by methods such as, but not limited to, bonding to a location generally, but not always, located substantially near the end of an optical fiber 20. In this embodiment, electromagnetic radiation such as, but not limited to, excitation light 30 in the form of optical pulses from a device such as, but not limited to, a low-power, broadband light-emitting diode (LED) source 40 or transmitter propagates along the fiber 20 to the phosphor material 10. The phosphor 10 absorbs the optical energy from the excitation light 30 at an excitation wavelength and spontaneously produces fluorescence emission light 50 at a fluorescence wavelength. A portion of the fluorescence emission light 50 is captured by the optical fiber 20 and propagates back through fiber 20 and is separated from the path of the excitation light 30 by optics 60 such as a beamsplitter or wavelength division multiplexer optical coupler and directed to a detector such as, but not limited to, an optical diode detector 70.

The LED source 40, the optics 60, and the optical diode detector 70 form an optical module 80. A processing module 90 controls the LED source 40 and processes temperature data from the optical diode detector 70. The processing module 90 may operate one, or more, of the optical modules 80 and sensing elements 10.

While the excitation light 30 is present at the phosphor 10, the fluorescence emission light 50 slowly increases toward a maximum value. After the excitation light 30 is switched off, the fluorescence emission light 50 then begins to decay (decrease in power of signal) with passage of time. The passage of time for the decay will depend upon the temperature of the phosphor 10. A conventional calibration procedure may be used in conjunction with the optical module 80 and the processing module 90 to correlate the temporal decay process with the temperature of the phosphor 10.

Figure 2A:
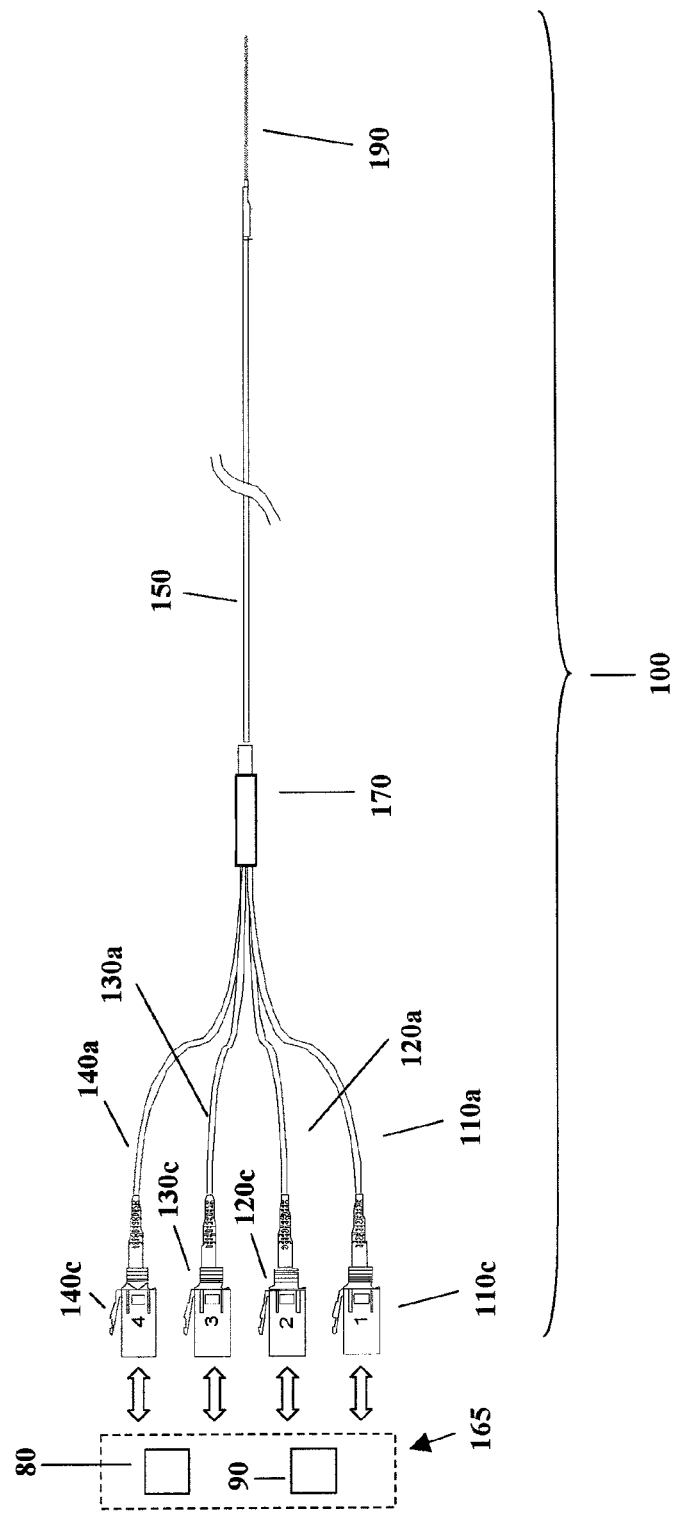
FIG. 2A is a schematic block diagram illustration of an example four-element fiber-optic temperature sensor.
Figure 2B:
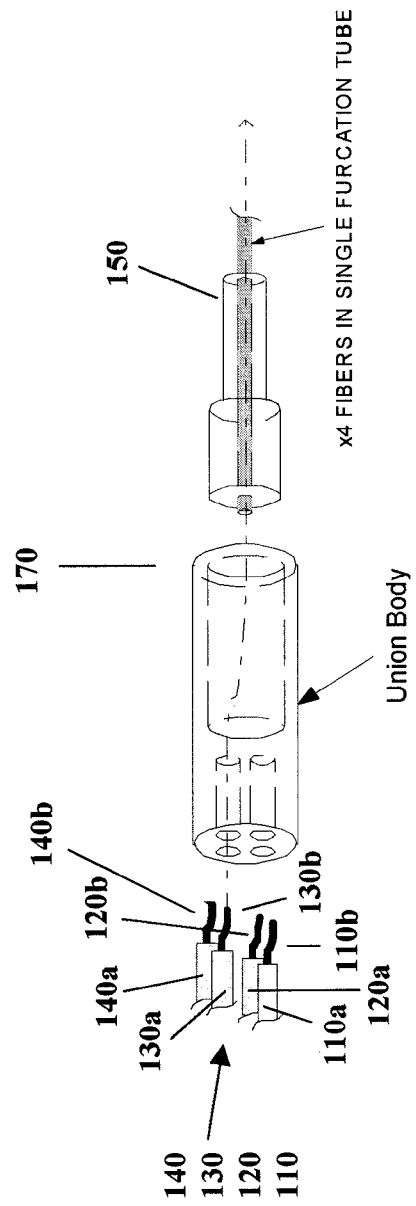
FIG. 2B is a schematic block diagram exploded-view illustration of the union body 170 in FIG. 2A.

An embodiment of this invention includes, but is not limited to, the example schematic design presented in FIGS. 2A, 2B, 2C, and 2D. Although the embodiment is described for an example with four sensing tips, the invention may accommodate any number of sensing tips or fibers 20 depending upon the fiber diameter being used, wall thickness of the protective tube over the fiber tips, and the requirements of the sensing application. FIGS. 2A, 2B, 2C, and 2D show a temperature sensor cable system 100 including four fiber optic cables 110, 120, 130, and 140, shown in FIG. 2B. Each one of the fiber optic cables 110, 120, 130, and 140 may include its own respective furcation tube 110a, 120a, 130a, and 140a, as shown in FIGS. 2A and 2B, and its own respective optical fiber 110b, 120b, 130b, and 140b, as shown in FIG. 2B. The fiber optic cables 110, 120, 130, and 140 are reduced to a single furcation cable 150 and terminated at a linear array 160 shown in FIG. 2C. Each of the fiber optic cables 110, 120, 130, and 140 is terminated in a respective connector 110c, 120c, 130c, and 140c used to interface with an optical-electronic processing module 165 that includes at least one optical module 80 and at least one processing module 90, as shown in FIG. 2A.

Figure 2C:
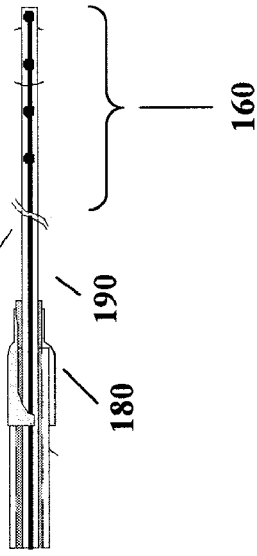
FIG. 2C is a schematic block diagram exploded-view illustration of the thin-walled sensing tube 190 in FIG. 2A.
Figure 2D:
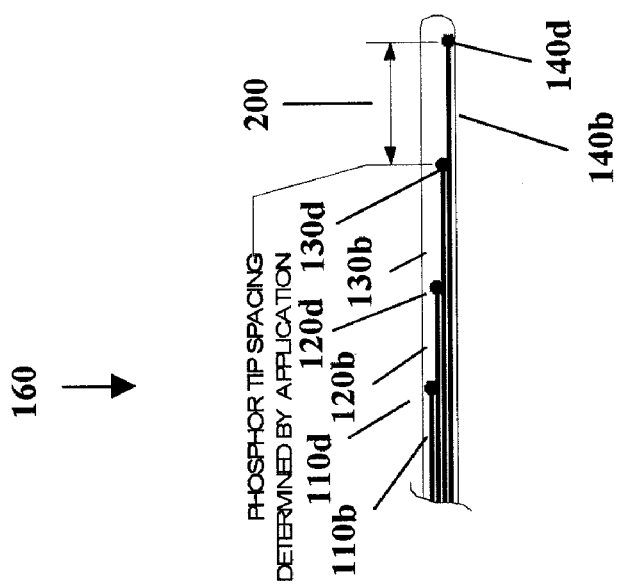
FIG. 2D is a schematic block diagram enlarged-view illustration of the linear array 160 in FIG. 2C.

The fiber optic cables 110, 120, 130, and 140 are grouped together with a union body 170 where the optical fibers 110b, 120b, 130b, and 140b are combined into the single furcation tube 150. The optical fibers 110b, 120b, 130b, and 140b pass through a further transition 180 into a thin-walled sensing tube 190 shown in FIGS. 2A and 2B. Each of the optical fibers 110b, 120b, 130b, and 140b may be terminated at a different length creating the linear array 160 having individual sensor spacing 200 as shown in FIGS. 2C and 2D. Temperature-sensing terminations 110d, 120d, 130d, and 140d shown in FIG. 2D of the optical fibers 110b, 120b, 130b, and 140b at the linear array 160 may include a phosphor-covered tip used to perform the temperature sensing function. As shown in FIG. 2A, connectors 110c, 120c, 130c and 140c include means for both inputting light at a first optical wavelength band (excitation light in the case of a phosphor performing the temperature sensing function) from the optical-electronic processing module 165 into the respective optical fibers 110b 120b, 130b and 140b (FIG. 2B) that subsequently propagates to the respective temperature sensing terminations 110d, 120 d, 130d and 140d (FIG. 2D) and outputting light at a second optical wavelength band (fluorescence emission light in the case of a phosphor performing the temperature sensing function) from the respective optical fibers 110b, 120b, 130b and 140b that propagates back from the respective temperature sensing terminations 110d, 120d, 130d and 140d to the optical-electronic processing module 165 (FIG. 2A)" at the end of paragraph 0019 of the specification.

The thickness of the thin-walled sensing tube 190 is typically on the order of, but not limited to, 100 microns allowing for good thermal conduction to the phosphors. Also, the outer diameter of the thin-walled sensing tube 190 is on the order of, but not limited to, 200-300 microns for a typical medical application, facilitating introduction into a catheter. In general, the constraints on the outer diameter of the sensing tube 190 will vary with the application.

The embodiment described herein arranges multiple, individually addressed, fiber-optic sensors to be contained within a single assembly with the sensing tips arranged in a linear array. Although this example is shown for a linear array of four sensing tips, the implementation is easily generalized to other quantities.

In summary, a temperature sensor may include a plurality of fiber optic cables each having a tip coated with phosphor that is in optical communication with the cable, wherein the phosphor has a florescence decay characteristic that is dependent upon its temperature. A furcation tube may enclose the plurality of fiber optic cables up to proximity of the respective tips of each of the plurality of fiber optic cables, but not covering the respective tips. The respective tips are located at a pre-determined spacing from each other to form a linear array with the respective tips. A separate connector for individual excitation and sensing of the respective tips may terminate each of the fiber optic cables.

Embodiments of this invention including, but not limited to, the embodiments described above may be utilized to determine temperature at multiple locations within an object such as, but not limited to, the volume of a tumor within a human body. The temperature may be determined via a conventional temperature calibration applied in the processing module 90 to the sensor temperature data that is obtained via one, or more, of the optical modules 80 from the temperature sensor cable system 100, as well as the fixed relative position of the temperature-sensing terminations 110d, 120d, 130d, and 140d with respect to one another. Optically addressed temperature sensors, other than those temperature sensors employing phosphors, can also be utilized within this invention.

Although the invention has been described with respect to various embodiments, it should be realized this invention is also capable of a wide variety of further and other embodiments within the spirit and scope of the appended claims.

What is claimed is:

1. An optical temperature sensing system comprising:
   a plurality of means for both inputting light at a first optical wavelength band and outputting light at a second optical wavelength band;
   a plurality of means for absorbing said light at said first optical wavelength band and emitting said light at said second optical wavelength band;
   said light at said second optical wavelength band includes features dependent upon temperature of said absorbing means;
   a plurality of means for propagating said light at said first optical wavelength band from each one of said plurality of inputting and outputting means to a unique one of said plurality of absorbing means and propagating said light at said second optical wavelength band from each one of said plurality of absorbing means to a unique one of said plurality of inputting and outputting means; and means for positioning each one of said plurality of absorbing means in a fixed relative position with respect to one another wherein location of temperature reading for each of said absorbing means is determined based upon said temperature-dependent features and said fixed relative position of said absorbing means.

2. The optical temperature sensing system of claim 1 wherein:

at least one of said plurality of absorbing means comprises a phosphor exhibiting temperature-dependent fluorescence decay.

3. The optical temperature sensing system of claim 1 wherein:

at least one of said plurality of propagating means comprises an optical fiber.

4. The optical temperature sensing system of claim 2 wherein:

at least one of said plurality of propagating means comprises an optical fiber.

5. The optical temperature sensing system of claim 1 wherein:

said positioning means comprises a sensing tube.

6. The optical temperature sensing system of claim 2 wherein:

said positioning means comprises a sensing tube.

7. The optical temperature sensing system of claim 6 wherein:

at least one of said plurality of propagating means comprises an optical fiber.

8. The optical temperature sensing system of claim 7 further comprising an optical module and a processing module operably connected to said inputting and outputting means in order to provide the temperature reading.

* * * * *